US009930512B2

(12) United States Patent
Naka et al.

(10) Patent No.: US 9,930,512 B2
(45) Date of Patent: Mar. 27, 2018

(54) WIRELESS COMMUNICATIONS DEVICE, WIRELESS COMMUNICATIONS METHOD, AND WIRELESS COMMUNICATIONS CONTROL PROGRAM

(71) Applicant: Panasonic Corporation, Osaka (JP)

(72) Inventors: Ken Naka, Tokyo (JP); Yoshio Urabe, Nara (JP); Masataka Irie, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 60 days.

(21) Appl. No.: 14/421,414

(22) PCT Filed: Feb. 21, 2014

(86) PCT No.: PCT/JP2014/000912
§ 371 (c)(1),
(2) Date: Feb. 12, 2015

(87) PCT Pub. No.: WO2014/199537
PCT Pub. Date: Dec. 18, 2014

(65) Prior Publication Data
US 2015/0195699 A1 Jul. 9, 2015

(30) Foreign Application Priority Data
Jun. 14, 2013 (JP) ................... 2013-125657

(51) Int. Cl.
*H04W 8/00* (2009.01)
*H04W 76/02* (2009.01)
*H04W 84/12* (2009.01)

(52) U.S. Cl.
CPC ......... *H04W 8/005* (2013.01); *H04W 76/023* (2013.01); *H04W 76/02* (2013.01); *H04W 84/12* (2013.01)

(58) Field of Classification Search
CPC ... H04W 8/005; H04W 76/023; H04W 76/02; H04W 84/12; H04W 48/08; H04W 48/16; H04W 8/00; H04W 76/00
(Continued)

(56) References Cited

U.S. PATENT DOCUMENTS 8,036,639 B2 10/2011 Carter et al.
8,792,644 B2 7/2014 Goto
(Continued)

FOREIGN PATENT DOCUMENTS

JP 2009-225182 A 10/2009
JP 2012-129898 A 7/2012
(Continued)

OTHER PUBLICATIONS

IEEE Standards Association, IEEE Std 802.11ad-2012, "Part 11: Wireless LAN Medium Access Control (MAC) and Physical Layer (PHY) Specifications," Amendment 3: Enhancements for Very High Throughput in the 60 GHz Band, IEEE Standard for Information technology—Telecommunications and information exchange between systems—Local and metropolitan area networks—Specific requirements, IEEE Computer Society, Dec. 28, 2012, 31 pages.

(Continued)

*Primary Examiner* — Michael Thier
*Assistant Examiner* — Rownak Islam
(74) *Attorney, Agent, or Firm* — Seed IP Law Group LLP

(57) ABSTRACT

The present disclosure provides such wireless communication apparatuses that when the wireless communication apparatuses perform direct communication using WiGig, one of the wireless communication apparatuses can transmit an action frame. Wireless communication apparatus 100 is a wireless communication apparatus that performs communication using WiGig and that includes: device searching section 142 that searches for other wireless communication apparatuses using a search signal; medium management section 143 that transmits, when a communication peer of wireless communication apparatus 100 is designated from among the found other wireless communication apparatuses, a temporary beacon including medium schedule information; and group formation section 144 that transmits an (Continued)

action frame to form a group with the designated other wireless communication apparatus after transmission of the temporary beacon.

5 Claims, 7 Drawing Sheets

(58) Field of Classification Search
USPC .................................................. 370/338, 329
See application file for complete search history.

(56) References Cited

U.S. PATENT DOCUMENTS

| | | | |
|---|---|---|---|
| 9,871,894 B2 | 1/2018 | Goto | |
| 2009/0052463 A1* | 2/2009 | Chen | H04W 72/1236 370/406 |
| 2010/0278343 A1 | 11/2010 | Goto | |
| 2011/0075642 A1 | 3/2011 | Cordeiro et al. | |
| 2011/0085529 A1 | 4/2011 | Choi et al. | |
| 2011/0149842 A1 | 6/2011 | Cordeiro | |
| 2012/0140769 A1* | 6/2012 | Hwang | H04L 65/602 370/389 |
| 2012/0218918 A1* | 8/2012 | Takae | H04W 8/005 370/255 |
| 2012/0250670 A1 | 10/2012 | Cordeiro | |
| 2013/0039358 A1 | 2/2013 | Ejima | |
| 2013/0100855 A1* | 4/2013 | Jung | H04W 12/06 370/254 |
| 2013/0272272 A1* | 10/2013 | Sudak | H04W 72/1242 370/336 |
| 2013/0329600 A1* | 12/2013 | Vedula | H04W 76/023 370/254 |
| 2014/0078928 A1* | 3/2014 | Verma | H04W 84/20 370/254 |
| 2014/0334343 A1 | 11/2014 | Goto | |
| 2015/0327262 A1* | 11/2015 | Kwon | H04W 72/0446 370/329 |

FOREIGN PATENT DOCUMENTS

| | | |
|---|---|---|
| JP | 2013-026981 A | 2/2013 |
| JP | 2013-038724 A | 2/2013 |
| JP | 2013-505666 A | 2/2013 |
| JP | 2013-511227 A | 3/2013 |

OTHER PUBLICATIONS

International Search Report dated Apr. 22, 2014, for corresponding Application No. PCT/JP2014/000912, 4 pages.

* cited by examiner

FIG. 3A

| Frame Control | Duration | BSSID | Body | FCS |
|---|---|---|---|---|

FIG. 3B

| Order | Information |
|---|---|
| 1 | Timestamp |
| 2 | Sector Sweep |
| 3 | Beacon Interval |
| 4 | Beacon Interval Control |
| 5 | DMG Parameters |
| 6 | Clustering Control |
| 7 | DMG Capabilities |
| 8 | Extended Schedule |
| 9 | RSN |
| 10 | Multiple BSSID |
| 11 | DMG Operation |
| 12 | Next DMG ATI |
| 13 | DMG BSS Parameter Change |
| 14 | Multi-band |
| Last – n | One or more elements can appear in this frame. These elements follow all other elements that are not vendor-specific elements and precede all other elements that are vendor-specific elements that are part of the Last field in the frame. Except for the Multi-band element, an element can be included only once in the frame. |
| Last | Vendor Specific |

FIG. 3C

| BSS Type | CBAP Only | CBAP Source | DMG Privacy | ECPAC Policy Enforced | Reserved |
|---|---|---|---|---|---|

FIG. 3D

| Element ID | Length | Allocation 1 | Allocation 2 | ... | Allocation n |
|---|---|---|---|---|---|

FIG. 3E

| Allocation Control | BF Control | Source AID | Destination AID | ATI Present | Allocation Start | Allocation Block Duration | Number of Blocks | Allocation Block Period |
|---|---|---|---|---|---|---|---|---|

FIG. 3F

| B0 | B1 | B2 B5 | B6 | B7 | B8 | B9 | B10 B13 | B14 |
|---|---|---|---|---|---|---|---|---|
| CC Present | Discovery Mode | Next Beacon | ATI Present | A-BFT Length | | | FSS | IsResponderTXSS |

Bits: 1, 1, 4, 1, 3, , , 4, 1

| B15 B18 | B19 | B20 B26 | B27 B30 | B31 B36 | B37 B42 | B43 | B44 B47 |
|---|---|---|---|---|---|---|---|
| Next A-BFT | Fragmented TXSS | TXSS Span | N BIs A-BFT | A-BFT Count | N A-BFT in Ant | PCP Association Ready | Reserved |

Bits: 4, 1, 7, 4, 6, 6, 1, 4

FIG. 6A

| Frame Control | Duration | Address 1 | Address 2 | Address 3 | Sequence Control | HT Control | Frame Body | FCS |

← MAC Header →

FIG. 6B

| Order | Information |
|---|---|
| 1 | Action |
| Last | One or more vendor-specific elements may appear in this frame. This element follows all other elements. |

FIG. 6C

| Order | Information |
|---|---|
| 1 | Category |
| 2 | Unprotected DMG Action |
| 3 | Timestamp |
| 4 | Beacon Interval |
| 5 | SSID (optional) |
| 6 | Extended Schedule (optional) |
| 7 | DMG Capabilities (optional) |
| 8 | RSN (optional) |
| 9 | Multiple BSSID (optional) |
| 10 | DMG Operation (optional) |
| 11 | Next DMG ATI (optional) |
| 12 | Multi-band (optional) |
| Last – n | Multiple elements can appear in this frame. These elements follow all other elements that are not vendor-specific elements and precede all other elements that are vendor-specific elements. |
| Last | Vendor Specific (optional) |

WIRELESS COMMUNICATIONS DEVICE, WIRELESS COMMUNICATIONS METHOD, AND WIRELESS COMMUNICATIONS CONTROL PROGRAM

The present disclosure relates to a wireless communication apparatus, a wireless communication method, and a wireless communication control program that that carry out wireless communication with another wireless communication apparatus.

BACKGROUND ART

Wi-Fi Direct (also referred to as "Wi-Fi P2P") is currently known which is a protocol for two wireless communication apparatuses to carry out direct communication without an access point in communication using Wi-Fi (hereinafter referred to as "Wi-Fi communication"). As disclosed in PTL 1, for example, Wi-Fi Direct enables two wireless communication apparatuses to communicate with each other through the following procedure.

First, the two wireless communication apparatuses search for each other by transmitting/receiving a beacon (Find Phase). Next, the two wireless communication apparatuses exchange information for determining roles as a Group Owner (hereinafter referred to as "GO") and a Client (hereinafter referred to as "CL") to form a group, execute WPS (Wi-Fi Protected Setup) and share authentication keys (Group Formation Procedure). Next, the wireless communication apparatus in the role of GO (hereinafter referred to as "GO" as appropriate) and the wireless communication apparatus in the role of CL (hereinafter referred to as "CL" as appropriate) execute WPA (Wi-Fi Protected Access) and CL participates in the group formed by GO (Operational Phase). This enables data to be communicated between GO and CL.

This mechanism of Wi-Fi Direct is also applicable to communication using WiGig (Wireless Gigabit) or IEEE802.11ad (hereinafter referred to as "WiGig communication") which is the wireless communication standard shown in NPL 1. By using a wireless wave band of 60 GHz which belongs to millimeter waves, WiGig communication can transmit/receive a large amount of data faster than Wi-Fi communication. In the following description, wireless communication apparatuses directly communicating with each other in WiGig communication is referred to as "WiGig P2P."

CITATION LIST

Patent Literature

PTL 1
U.S. Pat. No. 8,036,639

Non-Patent Literature

NPL 1
IEEE Std 802.11ad-2012

SUMMARY OF INVENTION

Technical Problem

However, WiGig defines that frames should be basically sent according to a schedule within a beacon interval except specific frames such as beacon or Probe. Since the schedule is determined to be indicated by schedule information included in a beacon or announce frame, unless one of the two wireless communication apparatus transmits a beacon or the like including the schedule information and manages the medium, it is not possible to transmit an action frame which is a group formation trigger to the other wireless communication apparatus. Thus, even when Wi-Fi Direct is currently applied to WiGig communication, the two wireless communication apparatuses do not transmit the schedule information after a device search is finished until a group is formed, and therefore there is a problem that neither medium management nor transmission of the action frame can be performed. As a result, the two wireless communication apparatuses cannot proceed to group formation, WPS and WPA and cannot perform data communication.

An object of the present disclosure is to provide a wireless communication apparatus, a wireless communication method and a wireless communication control program that allow one of wireless communication apparatuses to transmit an action frame when the wireless communication apparatuses carry out direct communication with each other using WiGig.

Solution to Problem

A wireless communication apparatus according to an aspect of the present disclosure performs communication using WiGig, the apparatus including: a searching section that searches for other wireless communication apparatuses using a search signal; a medium management section that transmits, when a communication peer of the wireless communication apparatus is designated from among the found other wireless communication apparatuses, a temporary signal including medium schedule information; and a group formation section that transmits an action frame to form a group with the communication peer after transmission of the temporary signal.

A wireless communication method according to an aspect of the present disclosure is a method for performing communication using WiGig, the method including: searching for other wireless communication apparatuses using a search signal; transmitting, when a communication peer of the wireless communication apparatus is designated from among the found other wireless communication apparatuses, a temporary signal including medium schedule information; and transmitting an action frame to form a group with the communication peer after transmission of the temporary signal.

A wireless communication control program according to an aspect of the present disclosure is a program for causing a computer of a wireless communication apparatus that performs communication using WiGig to perform processing, the program including the processing including: searching for other wireless communication apparatuses using a search signal; transmitting, when a communication peer of the wireless communication apparatus is designated from among the searched other wireless communication apparatuses, a temporary signal including medium schedule information; and transmitting an action frame to form a group with the communication peer after transmission of the temporary signal.

Advantageous Effects of Invention

The present disclosure allows one of wireless communication apparatuses to transmit an action frame when the wireless communication apparatuses perform direct communication with each other using WiGig.

BRIEF DESCRIPTION OF DRAWINGS

FIGS. 3A to 3F are diagrams illustrating a configuration example of a beacon temporarily transmitted by the wireless communication apparatus according to the present embodiment;

FIGS. 6A to 6C are diagrams illustrating a configuration example of an announcement frame temporarily transmitted by the wireless communication apparatus according to the present embodiment.

DESCRIPTION OF EMBODIMENT

Hereinafter, an embodiment of the present disclosure will be described in detail with reference to the accompanying drawings.

<Configuration of Wireless Communication Apparatus 100>

Figure 1:
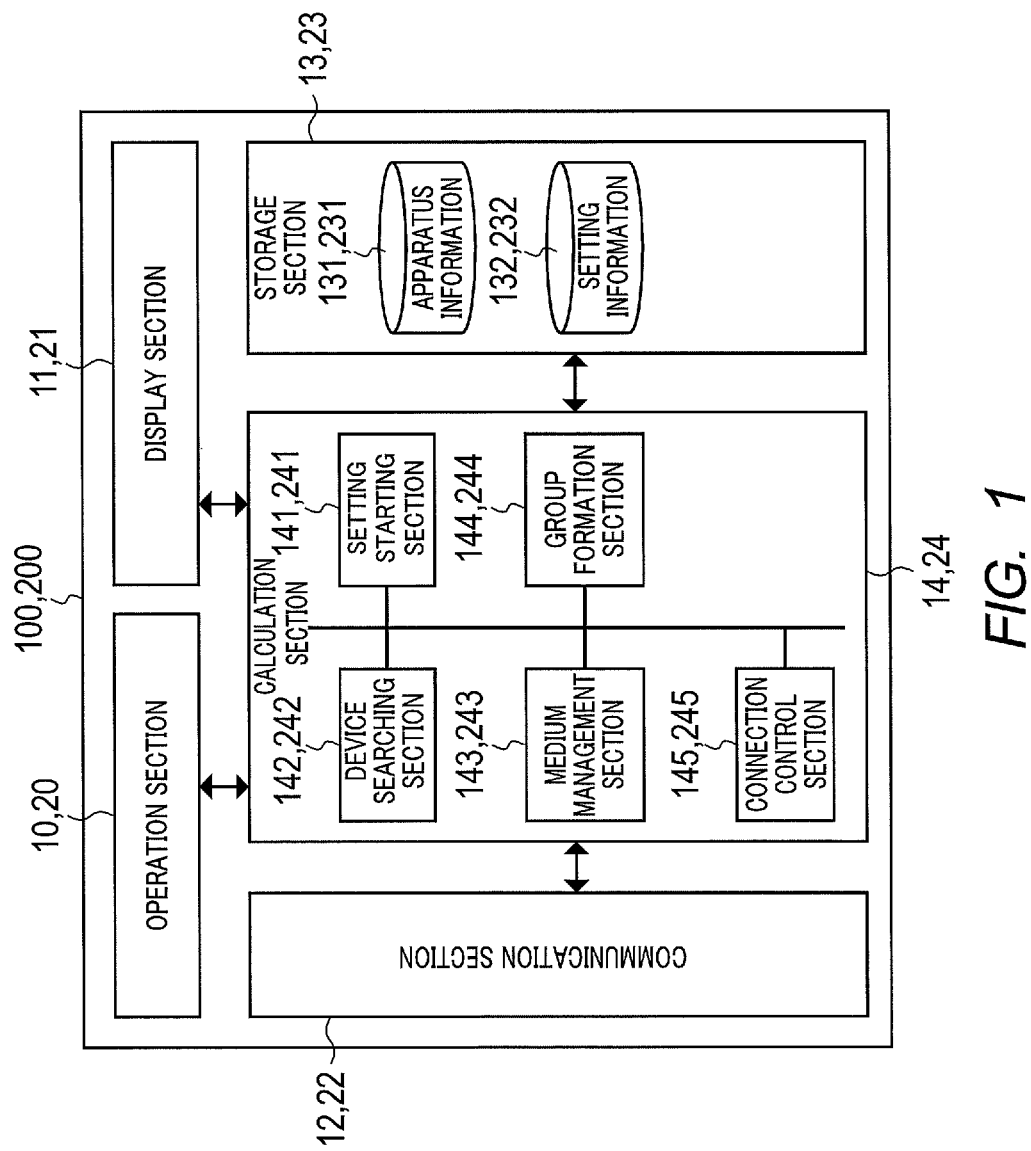
FIG. 1 is a block diagram illustrating a configuration example of a wireless communication apparatus according to an embodiment.

First, a configuration example of a wireless communication apparatus according to an embodiment of the present disclosure will be described with reference to FIG. 1. FIG. 1 is a diagram illustrating a configuration example of wireless communication apparatus 100 according to the present embodiment.

In FIG. 1, wireless communication apparatus 100 includes operation section 10, display section 11, communication section 12, storage section 13 and calculation section 14.

Operation section 10 is an input device that receives a user operation on a keyboard, mouse, hardware button, touch panel or the like.

Display section 11 is, for example, a display device such as a liquid crystal display.

Communication section 12 is an interface for realizing WiGig communication between wireless communication apparatus 100 and another wireless communication apparatus (e.g., wireless communication apparatus 200 which will be described later). In addition, communication section 12 is also an interface for realizing WPA (also including WPA2) between wireless communication apparatus 100 and the other wireless communication apparatus. WPA2 is a standard of a wireless LAN encryption scheme defined by Wi-Fi Alliance and supports a stronger encryption than WPA.

Storage section 13 is a non-volatile storage medium such as HDD (Hard Disc Drive), SSD (Solid State Drive) or flash memory. Storage section 13 stores software such as operating system and application, and various types of information as parameters. The above software is loaded into a work memory of calculation section 14 and started and operated by being subjected to calculation processing by a CPU (Central Processing Unit).

Storage section 13 stores apparatus information 131 and setting information 132. Apparatus information 131 includes specific information (e.g., MAC address, SSID) that can identify wireless communication apparatus 100 and capability information indicating wireless communication capability of wireless communication apparatus 100 (capability information defined in WiGig). This apparatus information 131 is created, for example, by a user starting a wireless setting application and inputting values for each parameter or stored in storage section 13 by installing software such as a driver of a wireless device or middleware or the like. Setting information 132 is information on an authentication key for executing WPA. This setting information 132 is created by executing WPS in a connection process between wireless communication apparatus 100 and the other wireless communication apparatus.

Calculation section 14 is constructed of, for example, a power supply, motherboard, CPU, recording medium such as ROM (Read Only Memory) storing a control program and working memory such as RAM (Random Access Memory) or the like.

Calculation section 14 includes setting starting section 141, device searching section 142, medium management section 143, group formation section 144, and connection control section 145. The functions of these sections are realized by the CPU executing a control program. Details of the sections will be described later.

Note that calculation section 14 may also be constructed of an integrated circuit integrated on one semiconductor chip as SoC (System on a Chip). In such a case, the sections of calculation section 14 may be individual chips or some of the sections may be contained on a single chip. "LSI (Large Scale Integration)," "IC (Integrated Circuit)," "system LSI," "super LSI," or "ultra LSI" may be adopted depending on differing extents of integration. Further, the integrated circuit integration may be implemented using dedicated circuitry or general purpose processors. The integrated circuit may be a programmable FPGA (Field Programmable Gate Array) or a reconfigurable processor where connections and settings of circuit cells within an LSI can be reconfigured. Furthermore, the respective sections of calculation section 14 may be implemented by integration using other integrated circuit technology (e.g., biotechnology) that comes out to replace LSI's as a result of the advancement of semiconductor technology or a derivative other technology.

Hereinafter, the sections provided for calculation section 14 will be described.

Setting starting section 141 receives a setting start request from operation section 10. Upon receiving an operation for requesting a start of setting with the other wireless communication apparatus, operation section 10 generates a setting start request and outputs it to setting starting section 141. The setting referred to here is a setting for wireless communication apparatus 100 to execute WiGig P2P with the other wireless communication apparatus. WiGig P2P refers to direct communication carried out between wireless communication apparatuses in WiGig communication as described above.

Upon receiving the setting start request, setting starting section 141 reads apparatus information 131 and setting information 132 from storage section 13. Setting starting section 141 outputs read apparatus information 131 and setting information 132 to device searching section 142.

Upon receiving apparatus information 131 and setting information 132 from setting starting section 141, device searching section 142 (an example of the searching section) starts searching for the other wireless communication apparatus(es) located in the periphery.

That is, device searching section 142 generates a frame such as a discovery beacon or a Probe Request (an example of a search signal) based on received apparatus information 131 and setting information 132. The discovery beacon or Probe Request includes specific information (e.g., MAC address, SSID) that can identify wireless communication apparatus 100 and capability information (capability information defined in WiGig) indicating wireless communication capability of wireless communication apparatus 100.

Next, device searching section 142 transmits the generated discovery beacon or Probe Request to the other wireless communication apparatus(es) via communication section 12. Device searching section 142 also receives the discovery beacon or Probe Response generated by the other wireless communication apparatus(es) via communication section 12. The discovery beacon or Probe Response received by device searching section 142 includes specific information that can identify the other wireless communication apparatus(es) and capability information indicating wireless communication capability of the other wireless communication apparatus(es).

Device searching section 142 generates search result information based on the discovery beacon or Probe Response received from the other wireless communication apparatus and outputs the search result information to display section 11. When one or more other wireless communication apparatuses have been successfully found, the search result information indicates the other wireless communication apparatuses that have been successfully found. On the other hand, when no other wireless communication apparatus has been successfully found, the search result information indicates that no other wireless communication apparatus has been successfully found. The search result information is displayed on display section 11.

When one or more other wireless communication apparatuses are successfully found, device searching section 142 generates apparatus information based on a discovery beacon or Probe Response for each wireless communication apparatus. This apparatus information includes specific information that can identify the other wireless communication apparatuses that have been successfully found and capability information indicating the wireless communication capability of the wireless communication apparatus(es) as in the case of apparatus information 131. The apparatus information generated on other wireless communication apparatuses in this way is referred to as "communication peer apparatus information" to be distinguished from apparatus information 131 on wireless communication apparatus 100.

Device searching section 142 determines the respective roles of wireless communication apparatus 100 and a communication peer (which becomes GO and which becomes CL) based on apparatus information 131 and communication peer apparatus information for each of the other wireless communication apparatuses that have been successfully found. This determination is made by applying a method defined in WiGig. Device searching section 142 generates information (hereinafter referred to as "role determination result") indicating a determination result for each determination.

There may be a case where no role determination is made at the time of the device search. In such a case, device searching section 142 generates the role determination result not at the time of a device search but at the time of group formation.

After that, device searching section 142 receives a communication peer instruction from operation section 10. The communication peer instruction refers to information generated by operation section 10 when a user operation designating a wireless communication apparatus indicated by search result information is received, and is information indicating the designated wireless communication Device searching section 142 outputs the communication peer apparatus information on the wireless communication apparatus indicated by the communication peer instruction, the role determination result on the wireless communication apparatus designated by the communication peer instruction and wireless communication apparatus 100, apparatus information 131 and setting information 132 to medium management section 143.

Upon receiving the communication peer apparatus information, role determination result, apparatus information 131 and setting information 132 from device searching section 142, medium management section 143 starts medium management as a temporary GO (e.g., generates and transmits a temporary beacon including medium schedule information) irrespective of the received role determination result. That is, medium management section 143 generates a beacon to be temporarily transmitted (hereinafter referred to as "temporary beacon," an example of temporary signal). Medium management section 143 starts transmitting the generated temporary beacon to a communication peer apparatus (other wireless communication apparatus designated by the user) via communication section 12. The temporary beacon differs from the above-described discovery beacon in the configuration. Details of the temporary beacon will be described later.

After starting transmission of the temporary beacon, medium management section 143 outputs the communication peer apparatus information, role determination result, apparatus information 131 and setting information 132 to group formation section 144.

Group formation section 144 receives a group formation start instruction from operation section 10. The group formation start instruction refers to information generated by operation section 10 when an operation of starting group formation between the previously designated communication peer apparatus and wireless communication apparatus 100 is received from the user and is information indicating an instruction for starting group formation.

Upon receiving the group formation start instruction from operation section 10, group formation section 144 starts group formation processing based on the communication peer apparatus information, apparatus information 131 and setting information 132 received from medium management section 143. The group formation processing is started by wireless communication apparatus 100 transmitting a Group Owner Negotiation Request frame (an example of an action frame) to the communication peer apparatus. Thus, group formation section 144 first transmits a Group Owner Negotiation Request frame via communication section 12. After that, information relating to group formation and information for carrying out WPS (hereinafter referred to as "WPS information") are transmitted/received between wireless communication apparatus 100 and the communication peer apparatus.

Upon starting the group formation processing (e.g., after transmission of a Group Owner Negotiation Request frame), group formation section 144 stops transmission of a temporary beacon.

Note that transmission of a temporary beacon may be stopped when transmission/reception of following three types of messages is completed: Group Owner Negotiation Request, response and confirm between the apparatuses.

Alternatively, transmission of a temporary beacon may be continued during transmission/reception of necessary action frames other than Group Owner Negotiation Request. In this case, transmission of the temporary beacon is stopped after transmission/reception of necessary action frames is completed.

Group formation section 144 changes the roles of wireless communication apparatus 100 and communication peer apparatus based on the role determination result received from medium management section 143. For example, when wireless communication apparatus 100 is operating as a temporary GO, wireless communication apparatus 100 is changed to CL. The wireless communication apparatus which has become GO will transmit a beacon thereafter.

After completion of transmission/reception of three types of messages of Group Owner Negotiation Request, response and confirm without receiving the role determination result from medium management section 143, when group formation section 144 generates a role determination result, group formation section 144 changes the roles using the generated role determination result.

Group formation section 144 executes WPS (sharing of authentication key) based on WPS information received from the communication peer apparatus.

When WPS is completed, group formation section 144 generates a group formation completion indication and outputs the indication to display section 11. Thus, information indicating that group formation is completed is displayed on display section 11. By this means, the group formation processing ends.

Group formation section 144 outputs apparatus information 131, setting information 132 and communication peer apparatus information to connection control section 145.

Connection control section 145 receives a connection request from operation section 10. The connection request is information generated by operation section 10 when an operation of requesting a connection to the communication peer apparatus is received from the user and is information indicating a request for a connection to the communication peer apparatus.

Upon receiving the connection request from operation section 10, connection control section 145 executes WPA (connection authentication) based on apparatus information 131, setting information 132 and the communication peer apparatus information received from group formation section 144. This enables encryption communication. Note that WPA2 may be adopted instead of WPA as described above.

Upon completion of WPS, group formation section 144 generates a connection completion indication for the completion of WPS and outputs the indication to display section 11. This causes the information indicating that the connection with the communication peer apparatus has been completed to be displayed on display section 11. This enables data communication using WiGig P2P between wireless communication apparatus 100 and the communication peer apparatus.

The sections provided for calculation section 14 have been described so far.

<Configuration of Other Wireless Communication Apparatus>

Hereinafter, another wireless communication apparatus (communication peer apparatus) that performs WiGig P2P with wireless communication apparatus 100 will be referred to as "wireless communication apparatus 200." Wireless communication apparatus 200 has the same configuration as that of wireless communication apparatus 100 shown in FIG. 1. That is, wireless communication apparatus 200 includes operation section 20, display section 21, communication section 22, storage section 23 and calculation section 24. These functional sections have the same functions as those of operation section 10, display section 11, communication section 12, storage section 13 and calculation section 14 in wireless communication apparatus 100 in that order. Calculation section 24 has the same configuration as that of the respective functional sections of calculation section 14 (setting starting section 241, device searching section 242, medium management section 243, group formation section 244, connection control section 245). Storage section 23 has the same kind of information as the information of storage section 13 (apparatus information 231, setting information 232). Apparatus information 231 includes specific information that can identify wireless communication apparatus 200 (e.g., MAC address, SSID) and information indicating the wireless communication capability of wireless communication apparatus 200 (Capability information).

Wireless communication apparatus 100 and wireless communication apparatus 200 are applicable to a smartphone, tablet, personal computer, blu-ray disc recorder, television, game machine, music player, dongle, access point, router or the like. Note that the dongle is a device attachable/detachable to/from a predetermined apparatus via an interface such as USB (Universal Serial Bus), HDMI (High-Definition Multimedia Interface) (registered trademark) or MHL (Mobile High-definition Link).

<Operation of Communication System>

Figure 2:
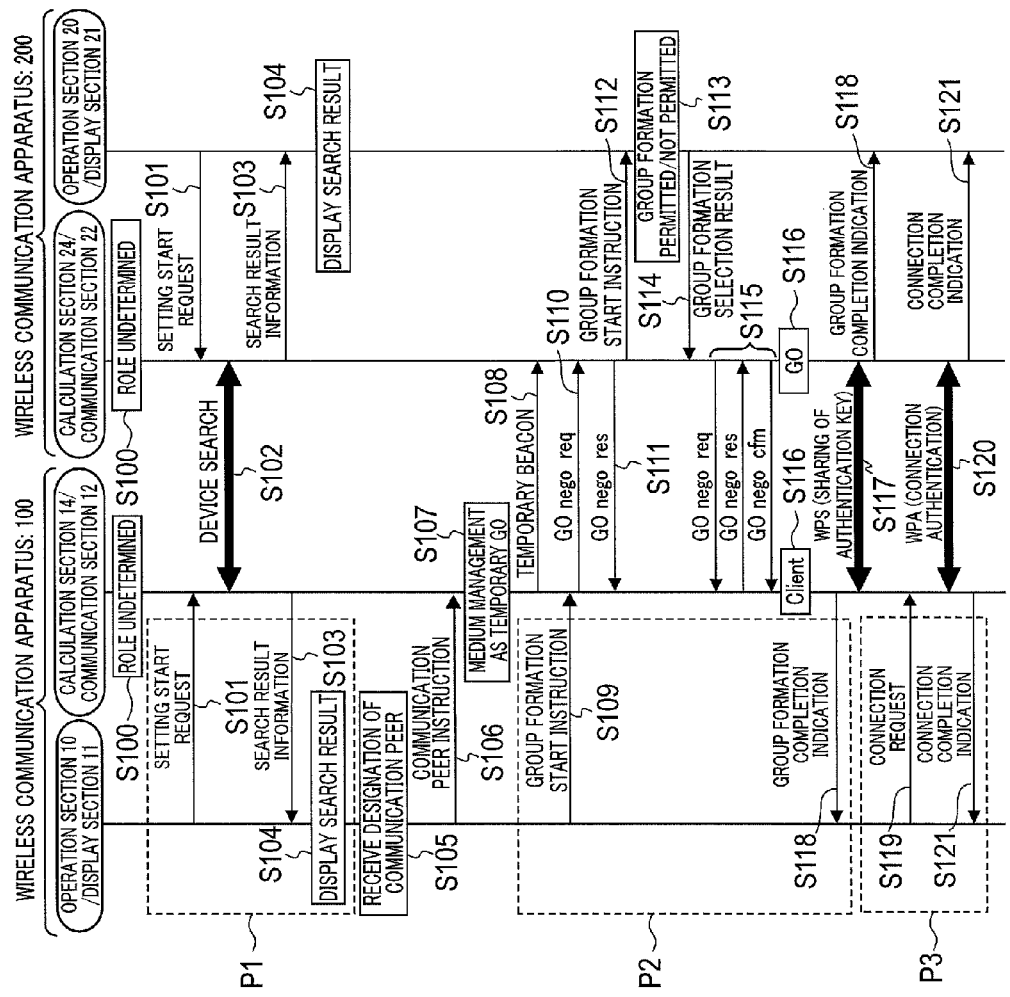
FIG. 2 is a sequence chart illustrating an operation example of a wireless communication system according to the present embodiment.

Hereinafter, an example of operation of connection processing carried out in the communication system according to the present embodiment, that is, between wireless communication apparatus 100 and wireless communication apparatus 200 will be described with reference to FIG. 2. FIG. 2 is a sequence chart illustrating an example of operation of connection processing carried out by wireless communication apparatus 100 and wireless communication apparatus 200.

The connection processing which will be described below is applicable to a case where data such as moving images or still images is transmitted/received between two wireless communication apparatuses possessed by two users via WiGig P2P or data such as moving images or still images is transmitted/received between a television in a home and a smartphone via WiGig P2P.

In step S100, the roles of wireless communication apparatus 100 and wireless communication apparatus 200 before the connection are undetermined. That is, wireless communication apparatuses 100 and 200 are neither CLs nor GOs, but STAs whose roles are undetermined.

In step S101, operation section 10 generates a setting start request based on the user operation and transmits the setting start request to calculation section 14. Similarly, operation section 20 generates a setting start request based on the user operation and transmits the setting start request to calculation section 24.

The user operation referred to here follows the following procedure, for example. First, the user places wireless communication apparatus 100 and wireless communication apparatus 200 so as to face each other to be able to wirelessly communicate with each other. Next, the user starts an application to carry out WiGig communication in wireless communication apparatuses 100 and 200. The user then selects a menu to start a WiGig communication device and software from a setting screen of the started application in wireless communication apparatuses 100 and 200. Wireless communication apparatuses 100 and 200 are thus instructed to make a connection setting using WiGig P2P and generate the aforementioned setting start request. The above application may be started by only one of wireless communication apparatuses 100 and 200.

Upon receiving the setting start request from operation section 10, setting starting section 141 of calculation section 14 reads apparatus information 131 and setting information 132 from storage section 13. Setting starting section 141 then outputs apparatus information 131 and setting information 132 to device searching section 142. Similarly, upon receiving the setting start request from operation section 20, setting starting section 241 of calculation section 24 reads apparatus information 231 and setting information 232 from storage section 23. Setting starting section 241 then outputs apparatus information 231 and setting information 232 to device searching section 242.

In step S102, upon receiving apparatus information 131 and setting information 132, device searching section 142 starts searching for other wireless communication apparatuses located in the periphery. Similarly, upon receiving apparatus information 231 and setting information 232, device searching section 242 starts searching for other wireless communication apparatuses located in the periphery.

That is, device searching sections 142 and 242 generate a frame such as a discovery beacon or a Probe Request based on received apparatus information 131, 231 and setting information 132, 232 as described above. Next, device searching sections 142 and 242 transmit the generated discovery beacon or Probe Request to the other wireless communication apparatus via communication sections 12 and 22 respectively. Furthermore, device searching sections 142 and 242 receive the discovery beacon or Probe Response generated by the other wireless communication apparatus from the other wireless communication apparatus via communication sections 12 and 22 respectively.

Here, device searching section 142 receives the discovery beacon or Probe Response from wireless communication apparatus 200 via communication section 12. On the other hand, device searching section 242 receives the discovery beacon or Probe Response from wireless communication apparatus 100 via communication section 22. As a result of the search, for example, suppose device searching section 142 succeeds in searching for at least wireless communication apparatus 200 and device searching section 242 succeeds in searching for at least wireless communication apparatus 100.

In step S103, device searching section 142 generates search result information based on the discovery beacon or Probe Response received from the other wireless communication apparatus as described above and outputs the search result information to display section 11. Similarly, device searching section 242 generates search result information based on the discovery beacon or Probe Response received from the other wireless communication apparatus and outputs the search result information to display section 21.

Here, the search result information generated by device searching section 142 is information indicating at least wireless communication apparatus 200 and the search result information generated by device searching section 242 is information indicating at least wireless communication apparatus 100.

In step S103, device searching section 142 generates communication peer apparatus information based on the discovery beacon or Probe Response received from the other wireless communication apparatus as described above. Similarly, device searching section 242 generates communication peer apparatus information based on the discovery beacon or Probe Response received from the other wireless communication apparatus. This communication peer apparatus information is generated for each of the other wireless communication apparatuses that have been successfully found.

Here, the communication peer apparatus information generated by device searching section 142 is information indicating at least wireless communication apparatus 200 and the communication peer apparatus information generated by device searching section 242 is information indicating at least wireless communication apparatus 100.

In step S103, device searching section 142 determines the respective roles of wireless communication apparatus 100 and the communication peer apparatus based on apparatus information 131 and the communication peer apparatus information as described above and generates a role determination result. Similarly, device searching section 242 determines the respective roles of wireless communication apparatus 200 and the communication peer apparatus based on apparatus information 231 and the communication peer apparatus information and generates a role determination result. A role determination result is generated for each communication peer that has been successfully searched. A role determination result is generated for each determination.

Here, for example, suppose the role determination result generated by device searching section 142 is CL and the role determination result generated by device searching section 242 is GO. That is, the role of wireless communication apparatus 100 is determined to be CL and the role of wireless communication apparatus 200 is determined to be GO.

When the role determination is not made at the time of the device search as described above, device searching section 142 generates the role determination result not at the time of the device search but at the time of group formation.

In step S104, display sections 11 and 21 display search results indicated by the search result information.

Here, display sections 11 and 21 display wireless communication apparatuses that have been successfully found. That is, display section 11 displays at least wireless communication apparatus 200 and display section 21 displays at least wireless communication apparatus 100. Note that when the search result information indicates a plurality of wireless communication apparatuses, display sections 11 and 21 display a list of a plurality of wireless communication apparatuses.

Steps S101 to S104 (P1 in FIG. 2) are referred to as "Find Phase."

In step S105, operation section 10 receives an operation of designating wireless communication apparatus 200 as a communicating peer from the user. Here, although a case has been described as an example where operation section 10 of wireless communication apparatus 100 receives an operation of designating wireless communication apparatus 200, operation section 20 of wireless communication apparatus 200 may also receive an operation of designating wireless communication apparatus 100.

In step S106, operation section 10 generates a communication peer instruction indicating that wireless communication apparatus 200 has been designated and outputs the communication peer instruction to calculation section 14.

Device searching section 142 of calculation section 14 identifies communication peer apparatus information on wireless communication apparatus 200 and role determination results on wireless communication apparatus 200 and wireless communication apparatus 100 based on the communication peer instruction. Next, device searching section 142 outputs the communication peer apparatus information, role determination result, apparatus information 131 and setting information 132 to medium management section 143.

In step S107, upon receiving the communication peer apparatus information, role determination result, apparatus information 131 and setting information 132 from device searching section 142, medium management section 143 starts medium management as a temporary GO irrespective of the received role determination result.

In step S108, medium management section 143 generates a temporary beacon and starts transmission to, wireless communication apparatus 200 via communication section 12. This enables an action frame (e.g., Group Owner Negotiation Request) to be transmitted from wireless communication apparatus 100 to wireless communication apparatus 200. Details of the temporary beacon will be described later.

After starting transmission of the temporary beacon, medium management section 143 outputs the communication peer apparatus information, role determination result, apparatus information 131 and setting information 132 to group formation section 144.

In step S109, upon receiving from the user, an operation of starting formation of a group between wireless communication apparatus 200 and wireless communication apparatus 100, operation section 10 generates a group formation start instruction and outputs the designation to group formation section 144.

Upon receiving the group formation start instruction from operation section 10, group formation section 144 starts group formation processing. The group formation processing is carried out based on the communication peer apparatus information, apparatus information 131, and setting information 132 received from medium management section 143.

In step S110, group formation section 144 transmits a Group Owner Negotiation Request frame (GO nego req) to wireless communication apparatus 200 via communication section 12. The group formation processing is started by this transmission. With this transmission, group formation section 144 controls communication section 12 so as to stop transmission of the temporary beacon. This control can eliminate the waste of continuing transmission of the temporary beacon after starting the group formation processing.

As described above, when transmission/reception of three types of messages of Group Owner Negotiation Request, response and confirm is completed between the apparatuses, transmission of the temporary beacon may be stopped.

Alternatively, transmission of the temporary beacon may be continued during transmission/reception of necessary action frames other than Group Owner Negotiation Request as described above and transmission of the temporary beacon may be stopped after completion of transmission/reception of the necessary action frames.

In step S111, upon receiving GO nego req from wireless communication apparatus 100, communication section 22 of wireless communication apparatus 200 transmits a Group Owner Negotiation Response frame (GO nego res) to wireless communication apparatus 100 via communication section 22 as a response thereto.

In step S112, upon receiving GO nego req, calculation section 24 (setting starting section 241) generates information indicating that group formation with wireless communication apparatus 100 is started (hereinafter referred to as "group formation start indication") and outputs the information to display section 21.

In step S113, upon receiving the group formation start indication, display section 21 displays a screen for the user to select whether or not to permit group formation with wireless communication apparatus 100.

In step S114, when the user receives the operation of selecting whether or not to permit group formation, operation section 20 generates information indicating the selection result (hereinafter referred to as "group formation selection result") and outputs the information to calculation section 24.

Here, suppose operation section 20 has received the operation from the user permitting the group formation with wireless communication apparatus 100. Thus, the group formation selection result indicates that the group formation with wireless communication apparatus 100 has been permitted.

In step S115, group formation section 244 of calculation section 24 transmits GO nego req including the group formation selection result from operation section 20 to wireless communication apparatus 100 via communication section 22. After that, information relating to group formation and WPS information are transmitted/received between wireless communication apparatus 100 and wireless communication apparatus 200 (e.g., GO nego res, GO nego cfm (Group Owner Negotiation Confirmation frame) in FIG. 2).

Transmission/reception between the apparatuses associated with group formation processing is not limited to that shown in steps S110 to S115.

In step S116, group formation section 144 changes the role of wireless communication apparatus 100 based on the role determination result received from medium management section 143. On the other hand, group formation section 244 acquires the role determination result from device searching section 242 and changes the role of wireless communication apparatus 200 based thereon.

As described above, when no role determination result is received from medium management section 143, and group formation section 144 generates a role determination result after transmission/reception of three types of messages of Group Owner Negotiation Request, response and confirm is completed, group formation section 144 changes the role using the generated role determination result.

That is, wireless communication apparatus 100 that has been operating as a temporary GO is changed to CL which is the original role indicated by the role determination result. On the other hand, wireless communication apparatus 200 is changed to GO which is the original role indicated by the role determination result. Thus, wireless communication apparatus 200 starts transmission of a beacon.

In step S117, group formation sections 144 and 244 execute WPS (sharing of authentication key) based on WPS information. Since WPS is well-known, description thereof will be omitted here.

In step S118, upon completion of WPS, group formation section 144 generates a group formation completion indication for the completion of WPS and outputs the indication to display section 11. Similarly, upon completion of WPS, group formation section 244 generates a group formation completion indication for the completion of WPS and outputs the indication to display section 21. Thus, information indicating that the group formation is completed is displayed on display sections 11 and 21. By this means, the group formation processing ends.

Group formation section 144 outputs apparatus information 131, setting information 132 and communication peer apparatus information to connection control section 145. Similarly, group formation section 244 outputs apparatus information 231, setting information 232 and communication peer apparatus information to connection control section 245.

Note that steps S109 to S118 (P2 in FIG. 2) is referred to as "Group Formation Procedure."

In step S119, upon receiving an operation for requesting a connection to wireless communication apparatus 200 from the user, operation section 10 generates a connection request and outputs the connection request to calculation section 14. Here, although a case has been described as an example where operation section 10 of wireless communication apparatus 100 receives an operation of requesting a connection to wireless communication apparatus 200, operation section 20 of wireless communication apparatus 200 may also receive an operation of requesting a connection to wireless communication apparatus 100.

In step S120, upon receiving the connection request from operation section 10, connection control section 145 of calculation section 14 executes WPA (connection authentication) with wireless communication apparatus 200 based on apparatus information 131, setting information 132, and communication peer apparatus information received from group formation section 144. Since WPA is well-known, description thereof will be omitted here. Encryption communication is enabled in this way.

In step S121, upon completion of WPS, group formation section 144 generates a connection completion indication for the completion of WPS and outputs the indication to display section 11. Similarly, upon completion of WPS, group formation section 244 generates a connection completion indication for the completion of WPS and outputs the indication to display section 21. Information indicating that the connection to the communication peer apparatus is completed is displayed on display sections 11 and 21 in this way. By this means, data communication using WiGig P2P is enabled between wireless communication apparatus 100 and the communication peer apparatus.

Note that steps S119 to S121 (P3 in FIG. 2) is referred to as "Operation Phase."

<Configuration of Temporary Beacon>

As described above, according to the present embodiment, when starting group formation, a wireless communication apparatus which has received a designation of a communication peer transmits a temporary beacon. Schedule information for medium management is added to the temporary beacon. Hereinafter, a configuration of the temporary beacon will be described with reference to FIGS. 3A to 3F and FIGS. 4A and 4B. These drawings are compliant with the WiGig standard.

FIG. 3A is a diagram illustrating an example of a frame format of the temporary beacon. In FIG. 3A, schedule information is added to Body.

FIG. 3B is a diagram illustrating parameters included in Body shown in FIG. 3A. Among the parameters shown in FIG. 3B, the schedule information corresponds to DMG Parameters and Extended Schedule.

FIG. 3C is a diagram illustrating a format of DMG Parameters. "CBAP Only" shown in FIG. 3C describes a parameter indicating whether or not a medium schedule (Beacon Interval) is composed of CBAP (Contention-Based Access Periods) only. CBAP is a best-effort medium schedule that can be transmitted/received by any wireless communication apparatus. When a medium schedule is composed of CBAP only, "true" is shown in CBAP Only. On the other hand, when a medium schedule is not comprised of CBAP only, that is, when the medium schedule includes SP (dedicated medium assignment), "false" is shown in CBAP Only. When CBAP Only is "false," Extended Schedule is added to designate a detailed schedule.

FIG. 3D is a diagram illustrating a format of Extended Schedule. When CBAP Only shown in FIG. 3C is false, details of the medium schedule (Beacon Interval) are shown by a plurality of ESEs (Extended Schedule Elements) shown in FIG. 3D. That is, the format shown in FIG. 3D shows how and what kind of blocks are arranged in the medium. In FIG. 3D, the same number of elements "Allocation" as the types of blocks are added.

FIG. 3E is a diagram illustrating a format of each element Allocation. The meaning of each field shown in FIG. 3E is as follows.

Allocation control: distinction of CBAP, SP or the like
BF Control: whether or not radio wave is beam-formed
Source AID, Destination AID: which wireless communication apparatus is linked to which wireless communication apparatus
Allocation Start: block start timing (µs)
Allocation block duration: duration of one block
Number of block: number of blocks included in one Beacon Interval
Allocation block period: interval (time) between blocks FIG. 3F is a diagram illustrating a format of a Beacon Interval Control field in FIG. 3B. Although Discovery Mode is a field for indicating a discovery beacon, since it is stipulated that this field is set to True when transmitting a beacon before network formation, Discovery Mode is also set to True with the temporary beacon. Therefore, a beacon which is formally the same as the discovery beacon may be used as a temporary beacon.

A temporary beacon flag may also be provided to explicitly indicate that the beacon is a temporary beacon to distinguish it from other beacons. The temporary beacon flag is preferably defined using a part defined as Reserved in the WiGig standard. For example, B44 among B44 to B47 which are Reserved in FIG. 3F may be designated as the temporary beacon flag. Alternatively, the DMG Parameters field in FIG. 3C may be extended, and 1 bit of the last Reserved part may be designated as a temporary beacon flag or value 0 designated as Reserved in the first BSS Type field (2 bits) may be allocated to a temporary beacon.

Figure 4A:
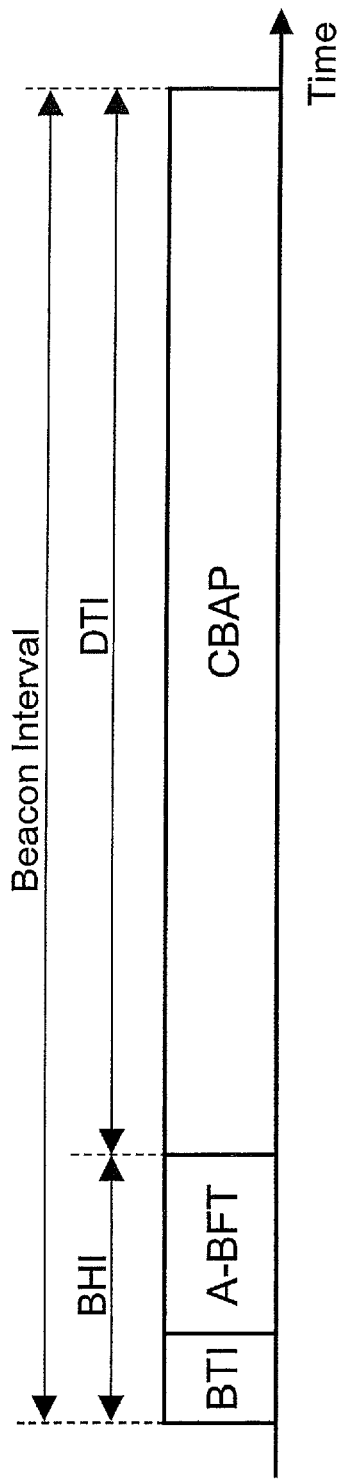
FIGS. 4A and 4B are diagrams illustrating an example of medium allocation in a beacon temporarily transmitted by the wireless communication apparatus according to the present embodiment.
Figure 4B:
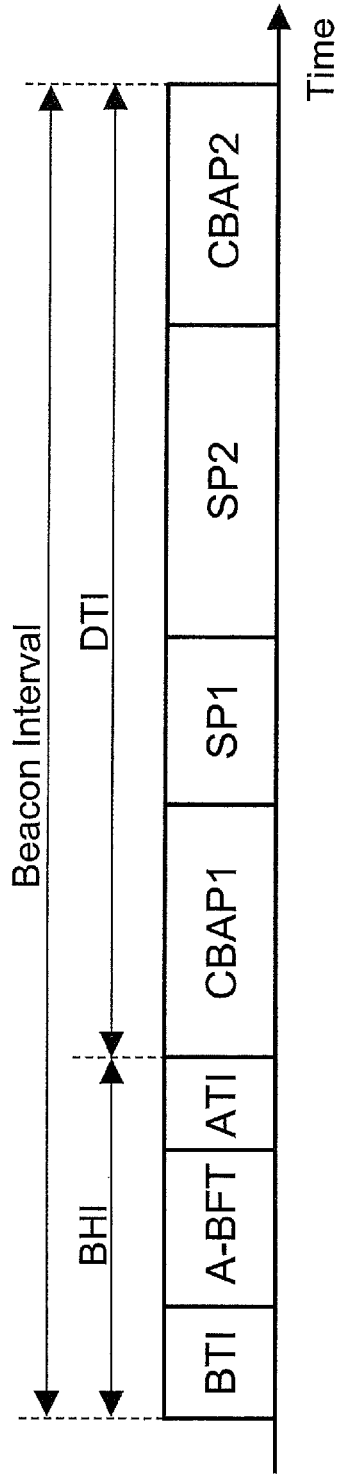

FIGS. 4A and 4B each illustrate a configuration example of a beacon interval. FIG. 4A illustrates a configuration when CBAP Only in FIG. 3 is true. In this case, DTI of the beacon interval is comprised of CBAP only. On the other hand, FIG. 4B illustrates a configuration when CBAP Only in FIG. 3 is false. In this case, DTI (Data Transfer Interval) of the beacon interval is composed of CBAPs and SPs.

By transmitting the temporary beacon configured as described above, each wireless communication apparatus can recognize how CBAP, SP or the like is allocated to a medium. Thus, according to the present embodiment, it is possible to transmit an action frame (e.g., Group Owner Negotiation Request frame) while the medium is being managed.

As described above, according to the present embodiment, when WiGig P2P is executed between the wireless communication apparatuses, the wireless communication apparatuses operate as follows. That is, after searching for a communication peer, the wireless communication apparatus that has received a designation as a communication peer from the user performs medium management as a temporary GO irrespective of the role determined in advance at the time of a search for a communication peer and transmits a temporary beacon to the wireless communication apparatus designated as the communication peer. This allows one of the wireless communication apparatuses to transmit a Group Owner Negotiation Request frame necessary to start group formation to the other wireless communication apparatus. As a result, the two wireless communication apparatuses can proceed to group formation, WPS and WPA and can execute data communication.

<Variations of Embodiment>

The present embodiment has been described so far, but the above embodiment is an example, and various modifications can be made. Hereinafter, these variations will be described.

Figure 5:
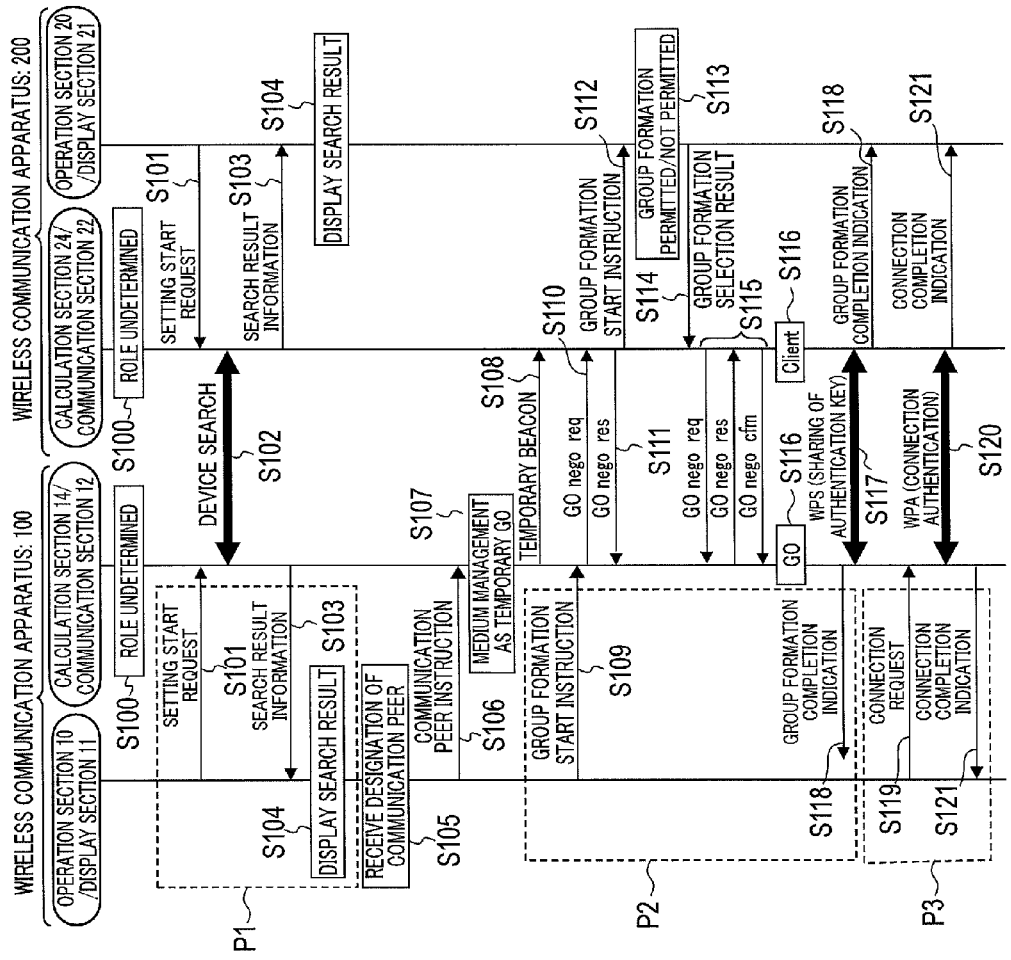
FIG. 5 is a sequence chart illustrating a variation of the operation of the wireless communication system according to the present embodiment.

Variation 1 will be described. In the above embodiment, determining a role during a device search is not necessarily mandatory. That is, one of wireless communication apparatuses 100 and 200 whose role is undetermined may generate and transmit a temporary beacon. One of wireless communication apparatuses 100 and 200 need not become a temporary GO when generating and transmitting a temporary beacon. A case has been described in the above embodiment as an example where the role determination result during a device search shows that wireless communication apparatus 100 is CL and wireless communication apparatus 200 is GO, but the roles may be reversed. A sequence in such a case is shown in FIG. 5. FIG. 5 illustrates a case as an example where the role determination result during a device search shows that wireless communication apparatus 100 is GO and wireless communication apparatus 200 is CL. In this FIG. 5, in step S116, wireless communication apparatus 100 becomes GO and wireless communication apparatus 200 becomes CL.

Variation 2 will be described. The above embodiment has shown an example where medium management is performed using a temporary beacon, but medium management may be performed using an announcement frame (an example of temporary signal). FIG. 6A is a diagram illustrating a format of an announcement frame. In FIG. 6A, schedule information is added to Frame Body.

FIG. 6B is a diagram illustrating parameters included in Frame Body shown in FIG. 6A. Extended Schedule is described in Last (vendor-specific region) shown in FIG. 6B. That is, as shown in FIG. 6C, schedule information of a medium is described in Extended Schedule.

By transmitting the announcement frame configured as described above, it is possible to perform medium management as in the case of transmission of a temporary beacon.

Variation 3 will be described. The above embodiment has described Group Owner Negotiation Request, Group Owner Negotiation Response, Group Owner Negotiation Confirmation as an example of an action frame used for group formation (see S110, S111 and S115 in FIG. 2), but action frames applicable to the present disclosure are not limited to these frames. For example, the action frame may be Provision Discovery Request, Provision Discovery Response used for switching of WPS information, Service Discovery Request, Service Discovery Response used for switching of service information, Group Discoverability Request, Group Discoverability Response used for inquiry to CL belonging to a predetermined group or P2P Invitation Request, P2P Invitation Response used for invitation to a predetermined group. That is, when transmitting these action frames, a wireless communication apparatus that has received a designation as a communication peer performs medium management as a temporary GO and transmits a temporary beacon.

Figure 7:
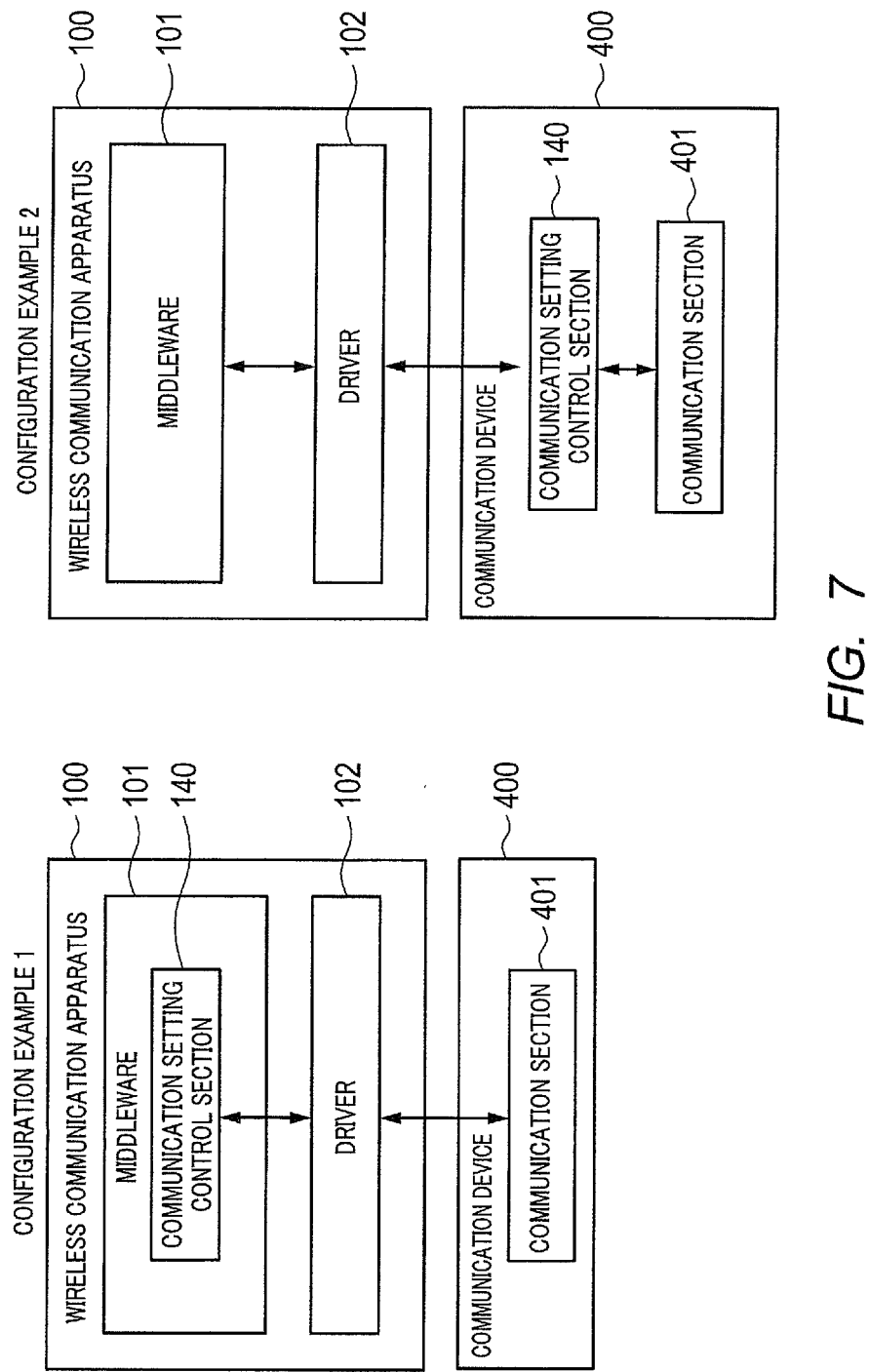
FIG. 7 is a diagram illustrating a configuration example using software according to the present embodiment.

Variation 4 will be described. Although a case has been described in the above embodiment where the present disclosure is configured with hardware by way of example, the disclosure may also be implemented by software in cooperation with hardware. FIG. 7 illustrates this configuration example. Although a case will be described below by taking wireless communication apparatus 100 as an example, the configuration in FIG. 7 is also applicable to wireless communication apparatus 200.

Configuration example 1 in FIG. 7 is a configuration in which wireless communication apparatus 100 is connectable to communication device 400 that enables WiGig communication. Wireless communication apparatus 100 is provided with middleware 101 and driver 102. Middleware 101 is provided with communication setting control section 140. Communication setting control section 140 includes the sections provided for calculation section 14 shown in FIG. 1. That is, in configuration example 1, the respective sections of calculation section 14 are implemented as middleware 101. Communication setting control section 140 controls communication section 401 of communication device 400 via driver 102 and performs WiGig communication. Note that middleware 101 may be an application. Communication setting control section 140 may be provided in driver 102.

Configuration example 2 in FIG. 7 is a configuration in which wireless communication apparatus 100 is connectable to communication device 400 that enables WiGig communication. However, configuration example 2 is different from configuration example 1 in that communication setting control section 140 is provided on the communication device 400 side. Communication setting control section 140 receives a request from middleware 101 via driver 102, controls communication section 401 and performs WiGig communication. Note that middleware 101 may be an application.

As described above, a wireless communication apparatus of the present disclosure is a wireless communication apparatus that performs communication using WiGig and that includes: a searcher that searches for other wireless communication apparatuses using a search signal; a medium manager that transmits, when a communication peer of the wireless communication apparatus is designated from among the found other wireless communication apparatuses, a temporary signal including medium schedule information; and a group formatter that transmits an action frame to form a group with the communication peer after transmission of the temporary signal.

In the wireless communication apparatus of this disclosure, the group formatter stops transmission of the temporary signal after transmission of the action frame.

In the wireless communication apparatus of the present disclosure, the temporary signal including the medium schedule information includes a flag indicating that the signal is a temporary beacon in order to distinguish the temporary beacon from an ordinary beacon.

A wireless communication method of the present disclosure is a method for performing communication using WiGig, the method including: searching for other wireless communication apparatuses using a search signal; transmitting, when a communication peer of the wireless communication apparatus is designated from among the found other wireless communication apparatuses, a temporary signal including medium schedule information; and transmitting an action frame to form a group with the communication peer after transmission of the temporary signal.

A wireless communication control program of the present disclosure is a program for causing a computer of a wireless communication apparatus that performs communication using WiGig to perform processing, the program including the processing including: searching for other wireless communication apparatuses using a search signal; transmitting, when a communication peer of the wireless communication apparatus is designated from among the searched other wireless communication apparatuses, a temporary signal including medium schedule information; and transmitting an action frame to form a group with the communication peer after transmission of the temporary signal.

The disclosure of Japanese Patent Application No. 2013-125657, filed on Jun. 14, 2013, including the specification, drawings and abstract is incorporated herein by reference in its entirety.

INDUSTRIAL APPLICABILITY

The present disclosure is useful as a wireless communication apparatus, wireless communication method and wireless communication control program that carry out wireless communication with another wireless communication apparatus.

REFERENCE SIGNS LIST

10 Operation section
11 Display section
12 Communication section
13 Storage section
14 Calculation section
100 Wireless communication apparatus
131 Apparatus information
132 Setting information
141 Setting starting section
142 Device searching section
143 Medium management section
144 Group formation section
145 Connection control section

The invention claimed is:
1. A wireless communication apparatus that performs communication using WiGig, the apparatus comprising:
  a searcher which, in operation:
    transmits a search signal to one or more other wireless communication apparatuses to form a group with a communication peer, and
    receives one or more signals indicating search results from the one or more other wireless communication apparatuses, the wireless communication apparatus and the one or more other wireless communication apparatuses being configurable to any of a group owner and a client,
  a medium manager which, in operation, transmits, as a temporary owner, a temporary signal including medium schedule information and information indicating assignments of a dedicated medium and a non-dedicated medium, when a signal designating the communication peer of the wireless communication apparatus from among found other wireless communication apparatuses is received from a user input device; and
  a group formatter which, in operation, transmits an action frame to form the group with the communication peer after transmission of the temporary signal, and sets either the wireless communication apparatus or the communication peer to be the group owner after the group is formed, based on apparatus information of the communication peer and apparatus information of the wireless communication apparatus.

2. The wireless communication apparatus according to claim 1, wherein the group formatter stops transmission of the temporary signal after transmission of the action frame.

3. The wireless communication apparatus according to claim 1, wherein the temporary signal including the medium schedule information includes a flag indicating that the signal is a temporary beacon in order to distinguish the temporary beacon from an ordinary beacon.

4. A wireless communication method for a wireless communication apparatus performing communication using WiGig, the method comprising:
  transmitting a search signal to one or more other wireless communication apparatuses to form a group with a communication peer;
  receiving one or more signals indicating search results from the one or more other wireless communication apparatuses, the wireless communication apparatus and the one or more other wireless communication apparatuses being configurable to any of a group owner and a client;
  transmitting, as a temporary owner, a temporary signal including medium schedule information and information indicating assignments of a dedicated medium and a non-dedicated medium, when a signal designating the communication peer of the wireless communication apparatus from among found other wireless communication apparatuses is received from a user input device;
  transmitting an action frame to form the group with the communication peer after transmission of the temporary signal; and
  setting either the wireless communication apparatus or the communication peer to be the group owner after the group is formed, based on apparatus information of the communication peer and apparatus information of the wireless communication apparatus.

5. A non-transitory computer readable medium containing contents which cause a wireless communication apparatus using WiGig to perform a method, the method comprising:
  transmitting a search signal to one or more other wireless communication apparatuses to form a group with a communication peer;
  receiving one or more signals indicating search results from the one or more other wireless communication apparatuses, the wireless communication apparatus and the one or more other wireless communication apparatuses being configurable to any of a group owner and a client;
  transmitting, as a temporary owner, a temporary signal including medium schedule information and information indicating assignments of a dedicated medium and a non-dedicated medium, when a signal designating the communication peer of the wireless communication apparatus from among found other wireless communication apparatuses is received from a user input device;
  transmitting an action frame to form the group with the communication peer after transmission of the temporary signal; and
  setting either the wireless communication apparatus or the communication peer to be the group owner after the group is formed, based on apparatus information of the communication peer and apparatus information of the wireless communication apparatus.

* * * * *